July 7, 1942.　　　　J. M. HALL　　　　2,289,191
METHOD OF DEHYDRATING LIQUID PRODUCTS
Filed Feb. 7, 1940
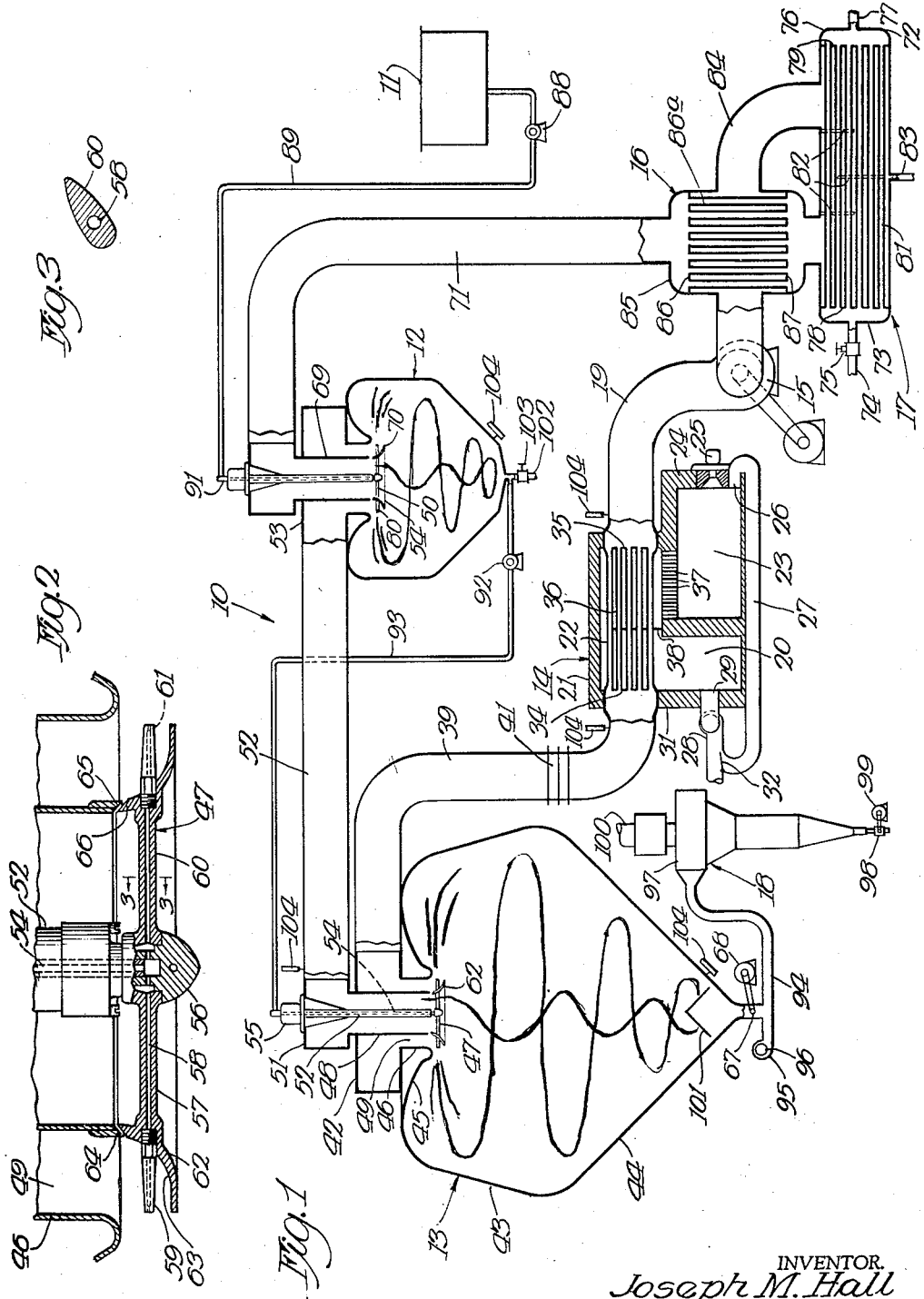
INVENTOR.
Joseph M. Hall
BY Mann, Brown & Co.
ATTORNEYS.

Patented July 7, 1942

2,289,191

UNITED STATES PATENT OFFICE 2,289,191

METHOD OF DEHYDRATING LIQUID PRODUCTS

Joseph M. Hall, Chicago, Ill., assignor to Drying & Concentrating Company, a corporation of Delaware Application February 7, 1940, Serial No. 317,721

5 Claims. (Cl. 159—48)

This invention relates to methods for concentrating liquid products and for dehydrating the same.

One of the objects of the invention is the provision of a new and improved method for concentrating and dehydrating a liquid product by circulating a gaseous fluid drying medium through a closed circuit and bringing the drying medium into direct contact with finely divided particles of the liquid product in both the concentrating and dehydrating stages.

Another object of the invention is the provision of a new and improved method for concentrating and dehydrating liquid products in a plurality of chambers through which air is caused to flow in a closed circuit and into which the product is discharged and subjected to the heated air in finely divided particles for a very brief period of time for evaporating moisture therefrom.

A further object of the invention is the provision of a new and improved method of evaporating and dehydrating a liquid product by discharging the product into a plurality of rapidly rotating masses of air within enlarged enclosures, successively, for removing moisture from those particles.

Another object of the invention is the provision of a new and improved method of removing moisture from liquid products capable of being practiced by apparatus which is simple in construction, easily assembled, economical in operation and that may be cleaned by a minimum expenditure of time and energy.

Other and further objects and advantages of the invention will appear from the following description, taken in connection with the accompanying drawing, in which—

Fig. 1 is a side elevation of the apparatus shown more or less diagrammatically, with parts in section and parts broken away, for the sake of clearness;

Fig. 2 is a vertical section through the distributor member, with parts broken away; and Fig. 3 is a section on the line 3—3 of Fig. 2.

In dehydrating liquid products, it is common practice to evaporate the moisture from the product by the aid of heat through an agency having direct or indirect contact therewith. Where the contact is indirect, the product must necessarily be subjected to the heat for a prolonged period of time. This latter is objectionable because of the ill effect prolonged heat has on certain types of liquid products. It has been proposed to dehydrate the product by direct contact with the heating agent at high temperatures, at least in the dehydrating or desiccating chamber. The heating agent, in many systems, is caused to flow in straight lines and be in contact with the product for a prolonged period. But such a system is also objectionable because of the likelihood of overheating the product. The overheating of certain products results in chemical changes that are objectionable because of the changing of the flavor and quality of the product when it is reconverted into a liquid.

The present invention seeks to remedy this difficulty by the provision of a novel system wherein the product is sprayed into direct contact with a spirally moving mass of the heating medium and is in contact with such medium but a very brief period of time. By moving the heating medium at high velocity in a spiral path, the medium, in contact with the small particles, will be continually changing due to the movement of the medium and to the centrifugal movement of the particles thereby bringing the particles continuously into new environment with the result that evaporation is rapid and effective.

It has been found that with the cyclone separator type of evaporators or dehydrators, the liquid product may be dehydrated in two stages of evaporation in a closed circuit. In the first stage, the product is concentrated and in the second stage it is dehydrated.

The heated air is first delivered to the dehydrator or last stage evaporator and desiccates or dehydrates the concentrate. The air is of such temperature that it is considerably above its saturation point when it leaves the dehydrator but, due to the intimate contact with the atomized liquid particles, it is at the saturation point when it leaves the first stage evaporator. Being at the saturation point when it is discharged from the first stage evaporator, the instant its temperature is decreased in the heat exchanger and condenser, the moisture in the air begins to condense, consequently, a minimum of condensing liquid is required in the condenser for removing the moisture from the air. With this system, there is a minimum amount of heat required in the first stage evaporator because the air leave the evaporator in a saturated or nearly saturated condition. As a result of this arrangement, the system may be so arranged that a minimum of heat is required, that is, the heating medium may be heated to a lower temperature for securing the desired results with as great or greater efficiency than with the conventional two stage evaporator systems. The temperatures of the heating medium will vary with the different products treated and with the different mediums employed. But one of the main advantages of the system lies in the fact that the particles of the product treated are not subjected to prolonged high temperatures in either stage of evaporation since the drying medium may make the circuit through the entire system in a minute or such matter.

Since the drying medium operates in a closed system, gases other than air may be used, as desired. In evaporating certain products, air as the heating medium is objectionable because of its oxidizing constituent.

Referring now to the drawing, the reference character 10 designates the entire system which comprises, essentially, a reservoir 11 for the liquid product, an evaporator or evaporator chamber 12, a dehydrator or evaporator chamber 13, a furnace 14 for heating the drying medium, a fan 15 for circulating the medium, a heat exchanger 16 for heating the circulating drying medium and for removing the moisture therefrom, a condenser 17 for removing the moisture from the drying medium preparatory to heating the same, and an air separator and cooler 18 for cooling the dehydrated product and for removing the air therefrom. In this system, the drying medium is in a closed circuit and is circulated through the system by the fan 15.

The construction of the mechanism of the system will be described by first tracing the air through its closed system and then tracing the liquid product in its travel.

Beginning at the fan 15, air discharged therefrom will pass along the conduit 19 into the heater 22. The heater 22 is mounted in the upper portion 21 of the furnace 14. The furnace 14 is provided with a smoke or discharge chamber 20 beneath the rear portion 21 of the heater and a combustion chamber 23 under the front end portion of the heater. In the front wall 24 of the furnace is mounted a burner 25 of the usual or any well known construction. The front wall 24 is also provided with an opening 26 through the same in which is secured one end of a conduit 27, the other end of which is connected to a conduit 28 which in turn is secured in an opening 29 in the rear furnace wall 31 and leads to the smokestack for carrying away products of combustion. The purpose of the conduit 27 is to recirculate the products of combustion or a portion thereof, through the combustion chamber, as may be desired, for conserving the heat contained therein. The passage 28 leads to the smokestack and a valve 32 is mounted at the junction of the passages 27 and 28 and is adapted to be adjusted so as to deflect a part or all of the combustion gases into the conduit 27, as may be desired.

The heater 22 is of the usual or any well known construction and comprises a casing 33 having flue sheets or partitions 34 and 35 at each end thereof within which are secured the ends of flues or tubular members 36 through which air from the conduit 19 is caused to flow. The products of combustion pass upwardly through openings 37 into the forward portion of the casing 33, flow about the tubes 36, then flow over the baffle 38 downwardly into the smoke chamber 20 and from thence to the stack through the conduit 28 or a portion or all of it may be returned through the passage 27 to the combustion chamber for conserving the heat therein. From the heater 22, the air passes upwardly through a conduit 39 in which a filter 41 may be secured, if desired. This filter may be inserted anterior of the heater, as occasion may require. From the conduit 39, the air is delivered to a snail 42 which in turn delivers the air into the dehydrator 13 in a spirally descending current.

The dehydrator 13 is of the centrifugal type and comprises an upper section 43 and a lower tapered section 44. The dehydrator is provided with a top wall 45 which is depressed about its axis and is attached to a tubular upstanding portion 46, the upper end of which is connected to the snail and constitutes a conduit through which the rotating air is conducted from the snail into the dehydrator chamber. The rotating column of air discharged from the snail passes downwardly across the spray member 47 and is deflected outwardly across the spray nozzles and into the dehydrating chamber, as will presently appear.

Suitable means are provided for atomizing the liquid product and also for removing the air axially upwardly out of the dehydrating chamber. The mechanism for accomplishing these functions will now be described.

Mounted on the snail 42 and extending downwardly axially of the dehydrating chamber is a hollow cylindrical casing 48, the lower end of which extends downwardly into the sleeve 46. The diameter of the casing 48 is much less than that of the sleeve 46 whereby an annular conduit 49 is provided. The upper end of the casing 48 terminates in an enlarged portion 51 which is in communication with a conduit 52 leading to the snail 53 of the evaporator 12. Attached to the upper wall of the enlarged portion 51 is a sleeve 52 which extends axially downwardly through the casing 48 and mounted within the sleeve 52 is a rotating shaft 54 which may be an elongation of the armature shaft of a motor 55 which rotates said shaft. Rigidly attached to the lower end of the shaft 54 is the spray head or atomizing member 47.

The atomizing member 47 comprises a hollow head 56 to which spray arms 57 are attached. The spray arms 57 extend radially outwardly and are provided with longitudinal bores 58 in communication with the interior of the hollow head 47 and have attached to their outer ends spray nozzles 59. The spray nozzles 59 have bores in alinement with the bores 58 of the arms 57 and the outer ends of these bores are greatly reduced, as shown at 61, Fig. 2. A circular deflector plate 62, having an outer concave face, as shown at 63, is rigidly mounted on the arms 57 as by being integral therewith. The lower end of the casing 48 may be provided with an extension 64, Fig. 2, having a lower beveled edge as at 65 for overlapping a corresponding beveled edge 66 on the deflector member 62. This arrangement prevents the air from flowing downwardly through the passage 49 from moving back upwardly around the lower edge of the casing 48.

The arms 57 of the spray head are flattened and turned at an angle to form an exhaust fan 60 for exhausting the air from the dehydrator. The rotation of the arms accentuates the rotation of the inner column of air thereby causing any dehydrated particles of the product caught up by this inner rotating column of air to be thrown back into the outer rotating column of air by centrifugal force and this outer column in turn will throw the particles outwardly by centrifugal force against the walls of the dehydrator to be collected at the bottom of the dehydrator chamber by the action of gravity.

In the operation of the dehydrator 13 as thus far described, the air passes downwardly in a spiral movement through the annular passage 49, across the outer ends of the nozzles 59, and since these nozzles are rotated about the shaft 54 at high velocity, the liquid product will be atomized and the air will be brought into intimate contact with the finely divided particles of the liquid product as they emerge from the nozzles and also as they move spirally around with the air and are thrown outwardly by centrifugal force against the walls of the dehydrator whereby these particles are dehydrated. These particles will collect in the lower part of the dehydrator, by gravity, and be discharged therefrom through a valve 67 operated by a motor 68. The air will move downwardly in a spiral to the lower part of the dehydrator and then will move spirally upwardly in a column of small diameter and be discharged from the dehydrator by the fan 60. The air passes from this fan through the conduit 52 into the snail 53 and from the snail 53, it is discharged into the evaporator chamber 12 across the distributor head 54 which is similar to the head 47 of the dehydrator 13. Since the dehydrator 12, the head 54 and the arrangement of the casing 69 and snail 53 are substantially the same as the dehydrator 13 and corresponding parts, it is not thought necessary to repeat the description further than to state that the arms 50 of the distributor 47 are flattened to form the blades of a fan 70 corresponding to the fan 60 of the dehydrator. The air passes spirally down into the evaporating chamber across the nozzles 80 and through the sprayed liquid product for evaporating moisture therefrom and then moves spirally upwardly in a column of small diameter under the influence of the fan 70, as in the previous construction.

The air, after it is exhausted by the fan 70, passes through a conduit 71 downwardly through a heat exchanger 16 into the condenser 17. The condenser 17 is of the usual or any well known type and comprises a casing 72 having the end 73 in which is attached a conduit 74 from a source of water supply. The conduit 74 is provided with a valve 75 for controlling the amount of water supplied to the condenser. The opposite end 76 has secured therein a discharge conduit 77 through which the water entering the condenser is discharged. The condenser casing is provided with flue sheets or partitions 78 and 79 adjacent the ends thereof in which are rigidly secured flues or pipes 81 through which the water introduced through the conduit 74 flows. The air entering the casing 72 through the conduit 71 and heat exchanger 16 flows about the tubes 81 and is caused to take a zigzag path through the casing 72 by the baffles 82 which extend from the upper and lower sides of the casing, as is well known in the art.

The water flowing through the tubes 81 of the casing 72 condenses moisture from the air entering from the heat exchanger 16 and this condensed moisture is discharged through a conduit 83 through the lower wall of the casing 72. The air that is introduced into the casing 72 through the conduit 71 flows out at the opposite end of the casing through a conduit 84 and through the heat exchanger 16 to the fan 15 thus completing the circuit.

The heat exchanger 16 is of the conventional type similar to the condenser 17 and comprises a casing 85 having the partitions or flue sheets 86 and 87 adjacent to the ends thereof. The air from the conduit 71 passes through the tubes 86a and the air flowing through the conduit 84 about the tubes 86a will become initially heated by the heated air flowing through the tubes. The heated air from the conduit 71 will in turn have its temperature reduced in both the heat exchanger 16 and the condenser 17. The air passing through the conduit 84 and about the tubes 86a will be initially heated and returned to the fan 15.

The structure relating to the atomizing of the liquid and its movement through the system will now be described.

Starting with the liquid in the container 11, it will be transferred by the pump 88 through a conduit 89 to the hollow tube 91 leading to the distributor head 54, as previously described. The sprayed particles will have a certain amount of moisture removed in the evaporator 12 by the heated air from the dehydrator and the concentrate will be collected in the lower portion of the evaporator chamber 12 where all or a portion of it is removed by a liquid pump 92 and discharged through a conduit 93 and the hollow shaft 54 into the distributor head of the dehydrator 13.

This concentrated product will be sprayed into the spirally moving air as described above and the dehydrated particles will collect on the bottom of the dehydrator chamber and be discharged into a conduit 94 through the valve 67, as previously described.

Suitable means are provided for cooling the dried particles and, as shown, a fan 95 is provided for this purpose. The intake 96 of the fan is in communication with the atmosphere and this fresh air is discharged into the conduit 54 for conveying the dried product to the separator 18 while simultaneously cooling the same. The separator 18 is of the centrifugal type and is provided with a snail 97 for causing the mixture of air and dehydrated particles to move spirally into the separator where the particles are separated from the air by centrifugal force and are collected by the force of gravity in the lower part of the separator where they may be removed through the valve 98 operated by a motor 99. The air will be discharged axially through a conduit 100 as is usual in such constructions.

If desired, the lower portion of the dehydrator may be provided with a cone-shaped member 101 which will tend to prevent the spirally moving current of air on its return movement upwardly along the axis of the dehydrator chamber from carrying particles of the dehydrated product along with it. Moreover, the conduit 93 may be provided with a discharge pipe 102 for removing concentrated liquid from the evaporator 12. A valve 103 is adapted to control the discharge of the liquid through the tube 102.

Suitable thermometers 104 may be inserted at suitable points in the apparatus for determining the temperature at those various points. These thermometers may be inserted in the casings of the evaporator and dehydrator chambers in the conduits anterior and posterior to the heater and at various other places, if desired.

Each of the evaporating chambers 12 and 13 are free of obstructions to the rotations of the air columns. This is considered an important feature of the invention because it not only assists in increasing the efficiency of the evaporating mechanism but renders the evaporating chambers more easily cleaned. This latter is extremely important because in certain products, such as milk and like products, the entire mechanism that comes in contact with the milk must be thoroughly cleaned each day it is used.

The drying medium being in a closed circuit, the medium may be inert gases such as carbon dioxide or the like which may be advantageous for dehydrating certain types of liquid products that are readily oxidized.

It is thought from the foregoing, taken in connection with the accompanying drawing, that the construction and operation of my device may be apparent to those skilled in the art and that changes in size, shape, proportion and detail may be made without departing from the spirit and scope of the appended claims.

I claim as my invention:

1. A method of evaporating and dehydrating in two stages only a liquid product which would be adversely affected if subjected to prolonged high temperatures which comprises first centrifugally spraying such product in substantially unheated, uncondensed condition and in the form of finely divided particles into a current of downwardly spirally moving heated air adjacent to the upper end of the axis of said spirally moving current in an enclosure free from obstructions and then causing said air to move upwardly in an inner spiral within said enclosure whereby moisture is evaporated from the product, conducting the resulting concentrate to a second enclosure having an unobstructed interior and centrifugally spraying said concentrate in the form of finely divided particles into the upper portion of a current of heated air moving spirally downwardly in said second enclosure, causing said air to move upwardly in an inner spiral within said second enclosure for dehydrating the concentrate, and then separating the air from the dehydrated product, all of the moisture evaporated from said product being removed by the air within said enclosures.

2. A method of evaporating and dehydrating in a plurality of separate heated air treatment stages only a liquid product which would be adversely affected if subjected to prolonged high temperatures which comprises first centrifugally spraying such product in substantially unheated, uncondensed condition and in the form of finely divided particles into a current of downwardly spirally moving heated air adjacent to the upper end of the axis of said spirally moving current in an enclosure free from obstructions and then causing said air to move upwardly in an inner spiral within said enclosure for concentrating the product, thereafter conducting the concentrate to another enclosure having an unobstructed interior and centrifugally spraying said concentrate in the form of finely divided particles into the upper portion of a current of heated air moving spirally downwardly in said other enclosure, causing said air to move upwardly in an inner spiral within said other enclosure for dehydrating the concentrate, and then separating the air from the dehydrated product, all of the moisture evaporated from said product being removed by the air within said enclosures.

3. A method of evaporating and dehydrating in two stages only a liquid product which would be adversely affected if subjected to prolonged high temperatures which comprises first centrifugally spraying such product in substantially unheated, uncondensed condition and in the form of finely divided particles into a current of downwardly spirally moving heated air adjacent to the upper end of the axis of said spirally moving current in an enclosure free from obstructions and then causing said air to move upwardly in an inner spiral within said enclosure for concentrating the product, conducting said air and concentrate to a second enclosure having an unobstructed interior and centrifugally spraying said concentrate in the form of finely divided particles into the upper portion of a current of said air moving spirally downwardly in said second enclosure, causing said air to move upwardly in an inner spiral within said second enclosure for dehydrating the concentrate, and then separating the air from the dehydrated product, all of the moisture evaporated from said product being removed by the air within said enclosures.

4. A method of evaporating and dehydrating in two stages only a liquid product which would be adversely affected if subjected to prolonged high temperatures which comprises first centrifugally spraying such product in substantially unheated, uncondensed condition and in the form of finely divided particles into a current of downwardly spirally moving heated air adjacent to the upper end of the axis of said spirally moving current in an enclosure free from obstructions and then causing said air to move upwardly in an inner spiral within said enclosure for concentrating the product, heating the air discharged from said enclosure and conducting it to a second enclosure having an unobstructed interior, conducting the concentrate to said second enclosure and centrifugally spraying said concentrate in the form of finely divided particles into a current of said heated air moving spirally downwardly in said second enclosure, causing said air to move upwardly in an inner spiral within said second enclosure for dehydrating the concentrate, and then separating the air from the dehydrated product, all of the moisture evaporated from said product being removed by the air within said enclosures.

5. A method of evaporating and dehydrating in two stages only a liquid product which would be adversely affected if subjected to prolonged high temperatures which comprises first centrifugally spraying such product in substantially unheated, uncondensed condition and in the form of finely divided particles into a current of downwardly spirally moving heated air adjacent to the upper end of the axis of said spirally moving current in an enclosure free from obstructions and then causing said air to move upwardly in an inner spiral within said enclosure for concentrating the product, removing moisture from and heating the air discharged from said enclosure and recycling it through a second enclosure having an unobstructed interior and thence to said first enclosure, conducting the concentrate to said second enclosure and centrifugally spraying said concentrate in the form of finely divided particles into a current of said heated air moving spirally downwardly in said second enclosure, causing said air to move upwardly in an inner spiral within said second enclosure for dehydrating the concentrate, and then separating the air from the dehydrated product, all of the moisture evaporated from said product being removed by the air within said enclosures.

JOSEPH M. HALL.